US012761803B2

(12) United States Patent
Wang et al.

(10) Patent No.: US 12,761,803 B2
(45) Date of Patent: Oct. 13, 2026

(54) DATA WRITING METHOD AND MEMORY CONTROLLER

(71) Applicant: Hefei Kaimeng Technology Co., Ltd., Anhui (CN)

(72) Inventors: En Yang Wang, Anhui (CN); Kuai Cao, Anhui (CN); Dong Dong Yao, Anhui (CN); Yun Peng Zhang, Anhui (CN); Ya Jie Guo, Anhui (CN); Tsung-Lin Wu, Anhui (CN); Qiao Zhu, Anhui (CN)

(73) Assignee: Hefei Kaimeng Technology Co., Ltd., Anhui (CN)

( * ) Notice: Subject to any disclaimer, the term of this patent is extended or adjusted under 35 U.S.C. 154(b) by 0 days.

(21) Appl. No.: 19/080,910

(22) Filed: Mar. 16, 2025

(65) Prior Publication Data

US 2026/0003505 A1 Jan. 1, 2026

(30) Foreign Application Priority Data

Jun. 26, 2024 (CN) ......................... 202410838751.4

(51) Int. Cl.
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
CPC .... G06F 3/0613; G06F 3/0659; G06F 3/0679; G06F 3/061; G06F 3/0655; G06F 12/0238; G06F 12/10
USPC .......................................................... 711/154
See application file for complete search history.

(56) References Cited

U.S. PATENT DOCUMENTS

| | | | | |
|---|---|---|---|---|
| 2016/0132251 | A1* | 5/2016 | Hwang | G06F 3/0679 711/154 |
| 2016/0283116 | A1* | 9/2016 | Ramalingam | G06F 13/16 |
| 2019/0294376 | A1* | 9/2019 | Park | G06F 3/064 |
| 2023/0376228 | A1* | 11/2023 | Cariello | G06F 3/0655 |
| 2025/0053338 | A1* | 2/2025 | Jadon | G06F 12/10 |
| 2025/0077084 | A1* | 3/2025 | Bert | G06F 3/0613 |

* cited by examiner

*Primary Examiner* — Jared I Rutz
*Assistant Examiner* — Wei Ma
(74) *Attorney, Agent, or Firm* — JCIPRNET

(57) ABSTRACT

A memory controller and data writing method are provided. The data writing method includes: obtaining and storing a first instruction sequence comprising a plurality of write instructions to a buffer memory; determining a plurality of first write instructions that satisfy preset conditions according to first information and second information of the write instructions; performing ascending order arrangement on the plurality of first write instructions to form a second instruction sequence; according to the second instruction sequence, sequentially executing each first write instruction so as to write sequential write data into a rewritable non-volatile memory module. As such, the write data corresponding to sequential write instructions can be effectively written sequentially into the rewritable non-volatile memory module, so as to actually execute sequential write operation required by a host system, thereby reducing random write operations caused by multi-threading and improving overall data access capability of a storage device.

18 Claims, 9 Drawing Sheets

DATA WRITING METHOD AND MEMORY CONTROLLER

CROSS-REFERENCE TO RELATED APPLICATION

This application claims the priority benefit of China application serial no. 202410838751.4, filed on Jun. 26, 2024. The entirety of the above-mentioned patent application is hereby incorporated by reference herein and made a part of this specification.

BACKGROUND

Technical Field

The present invention relates to a memory management technology, particularly to a data writing method for a non-volatile memory and a memory controller using the method.

Description of Related Art

A non-volatile memory module storage device is a slave device which requires commands from a host system to process data. To improve performance, the operating system of the host system introduces multi-threading technology. However, multi-threading technology causes write commands sent from the host system to the non-volatile memory module storage device to be executed randomly rather than sequentially, and the performance of the non-volatile memory module storage device decreases when processing random writes. Therefore, there is an urgent need for a memory controller and data writing method to solve the above problems.

SUMMARY

The purpose of the present invention is to solve the above problems, so as to avoid sequential write data being written by non-sequential write operations due to a plurality of processing threads.

One or more embodiments of the present invention provide a data writing method applied to control a storage device configured with a rewritable non-volatile memory module. The storage device comprises: a memory interface control circuit, for coupling to the rewritable non-volatile memory module; a buffer memory; and a processor, coupled to the memory interface control circuit and the buffer memory, wherein the processor is further coupled to a connection interface circuit of the storage device for coupling to a host system, the method comprising: obtaining and storing a first instruction sequence to the buffer memory, wherein the first instruction sequence comprises a plurality of write instructions, each write instruction comprises first information and second information, the first information comprises a sequential mark, the sequential mark is used to indicate a thread number of sending the corresponding write instruction, the second information comprises a logical address and a data size; according to the first information and the second information, determining a plurality of first write instructions from the plurality of write instructions that satisfy preset conditions, wherein the plurality of first write instructions respectively correspond to a plurality of first write data, the plurality of first write data are obtained by dividing sequential write data; obtaining the plurality of first write instructions and performing ascending order arrangement on the plurality of first write instructions to form a second instruction sequence, wherein a first arrangement order of the plurality of first write instructions in the first instruction sequence is different from a second arrangement order in the second instruction sequence; and according to the second instruction sequence, sequentially executing the plurality of first write instructions, so as to write the sequential write data into the rewritable non-volatile memory module.

In an embodiment of the present invention, wherein performing ascending order arrangement on the plurality of first write instructions to form the second instruction sequence comprises: obtaining a first instruction and a second instruction from the plurality of first write instructions, wherein the first instruction corresponds to a first logical address, the second instruction corresponds to a second logical address; according to the first logical address and the second logical address, performing ascending order arrangement on the first instruction and the second instruction to obtain a second sub-instruction sequence; obtaining remaining write instructions sequentially and updating the second sub-instruction sequence according to corresponding logical addresses thereof until all first write instructions are obtained to obtain the second instruction sequence, wherein the remaining write instructions are the first write instructions that have not been performed with ascending order arrangement in the plurality of first write instructions, the remaining write instructions comprise one or more instructions.

In an embodiment of the present invention, wherein the remaining write instructions comprise a third instruction, the third instruction corresponds to a third logical address, when the second logical address is greater than the first logical address, obtaining the remaining write instructions sequentially and updating the second sub-instruction sequence according to corresponding logical addresses thereof comprises: if the third logical address is greater than the second logical address, inserting the third instruction at a tail of the second sub-instruction sequence to obtain a third sub-instruction sequence; if the third logical address is less than the first logical address, inserting the third instruction at a head of the second sub-instruction sequence to obtain the third sub-instruction sequence; and if the third logical address is greater than the first logical address and less than the second logical address, inserting the third instruction between the first instruction and the second instruction to obtain the third sub-instruction sequence.

In an embodiment of the present invention, wherein obtaining and storing the first instruction sequence to the buffer memory comprises: obtaining the plurality of write instructions from the host system, wherein the write instructions are respectively sent by a plurality of processing threads of the host system; forming the first instruction sequence according to receiving times of the plurality of write instructions; storing the first instruction sequence into the buffer memory.

In an embodiment of the present invention, the method further comprises removing the obtained plurality of first write instructions from the first instruction sequence, and executing the second instruction sequence, so as to write the sequential write data corresponding to the sequential write instruction into the rewritable non-volatile memory module.

In an embodiment of the present invention, wherein determining the plurality of first write instructions that satisfy the preset conditions according to the first information and the second information comprises: identifying the thread number of each write instruction according to the first information; identifying the logical address and the data size of each write instruction according to the second information; determining the plurality of first write instructions that satisfy the preset conditions according to the thread number, the logical address and the data size, wherein the preset conditions comprise: logical addresses between the plurality of first write instructions are continuous, thread numbers of the plurality of first write instructions based on logical address sorting are continuous and arranged in ascending order, and a sum of data sizes of first write data corresponding to the plurality of first write instructions is equal to a predetermined storage data size.

In an embodiment of the present invention, wherein the thread numbers corresponding to the plurality of first write instructions in the second instruction sequence are continuous and arranged in ascending order, a sum of the data sizes corresponding to the plurality of first write instructions in the second instruction sequence is equal to the predetermined storage data size, and the first logical addresses corresponding to the plurality of first write instructions in the second instruction sequence are continuous.

In an embodiment of the present invention, wherein before executing the plurality of first write instructions according to the second instruction sequence to write the sequential write data into the rewritable non-volatile memory module, the method comprises: setting a queue status register according to the second arrangement order, so as to indicate the host system to perform sequential write operation according to the second arrangement order.

In an embodiment of the present invention, wherein before obtaining the plurality of first write instructions, the method comprises: determining whether the plurality of first write instructions allow overwrite operation, wherein if overwrite operation is allowed, not obtaining the plurality of first write instructions; if overwrite operation is not allowed, obtaining the plurality of first write instructions and performing ascending order arrangement to obtain the second instruction sequence.

One or more embodiments of the present invention further provide a memory controller for controlling a storage device configured with a rewritable non-volatile memory module. The memory controller comprises: a memory interface control circuit, for coupling to the rewritable non-volatile memory module; a buffer memory; and a processor. The processor is coupled to the memory interface control circuit and the buffer memory, wherein the processor is further coupled to a connection interface circuit of the storage device for coupling to a host system. Wherein the processor is configured to: obtain and store a first instruction sequence to the buffer memory, wherein the first instruction sequence comprises a plurality of write instructions, each write instruction comprises first information and second information, the first information comprises a sequential mark, the sequential mark is used to indicate a thread number of sending the corresponding write instruction, the second information comprises a logical address and a data size; according to the first information and the second information, determine a plurality of first write instructions from the plurality of write instructions that satisfy preset conditions, wherein the plurality of first write instructions respectively correspond to first write data, the plurality of first write data are obtained by dividing sequential write data; obtain the plurality of first write instructions and perform ascending order arrangement on the plurality of first write instructions to form a second instruction sequence, wherein a first arrangement order of the plurality of first write instructions in the first instruction sequence is different from a second arrangement order in the second instruction sequence; and according to the second instruction sequence, sequentially execute the plurality of first write instructions, so as to write the sequential write data into the rewritable non-volatile memory module.

Based on the above, the memory controller and the data writing method used thereby provided by the embodiments of the present invention can actively reorder the obtained plurality of write instructions when the plurality of threads of the host system non-sequentially send the plurality of write instructions corresponding to sequential write instruction respectively, so as to perform sequential write operation according to the arrangement order of the reordered plurality of write instructions. As such, the problem that traditional storage devices and memory controllers using data writing methods cannot execute sequential write operations expected by the host system can be solved, the write data corresponding to sequential write instructions can be effectively written sequentially into the rewritable non-volatile memory module, so as to actually execute sequential write operations required by the host system, thereby reducing random write operations caused by multi-threading and improving overall data access capability of the storage device.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
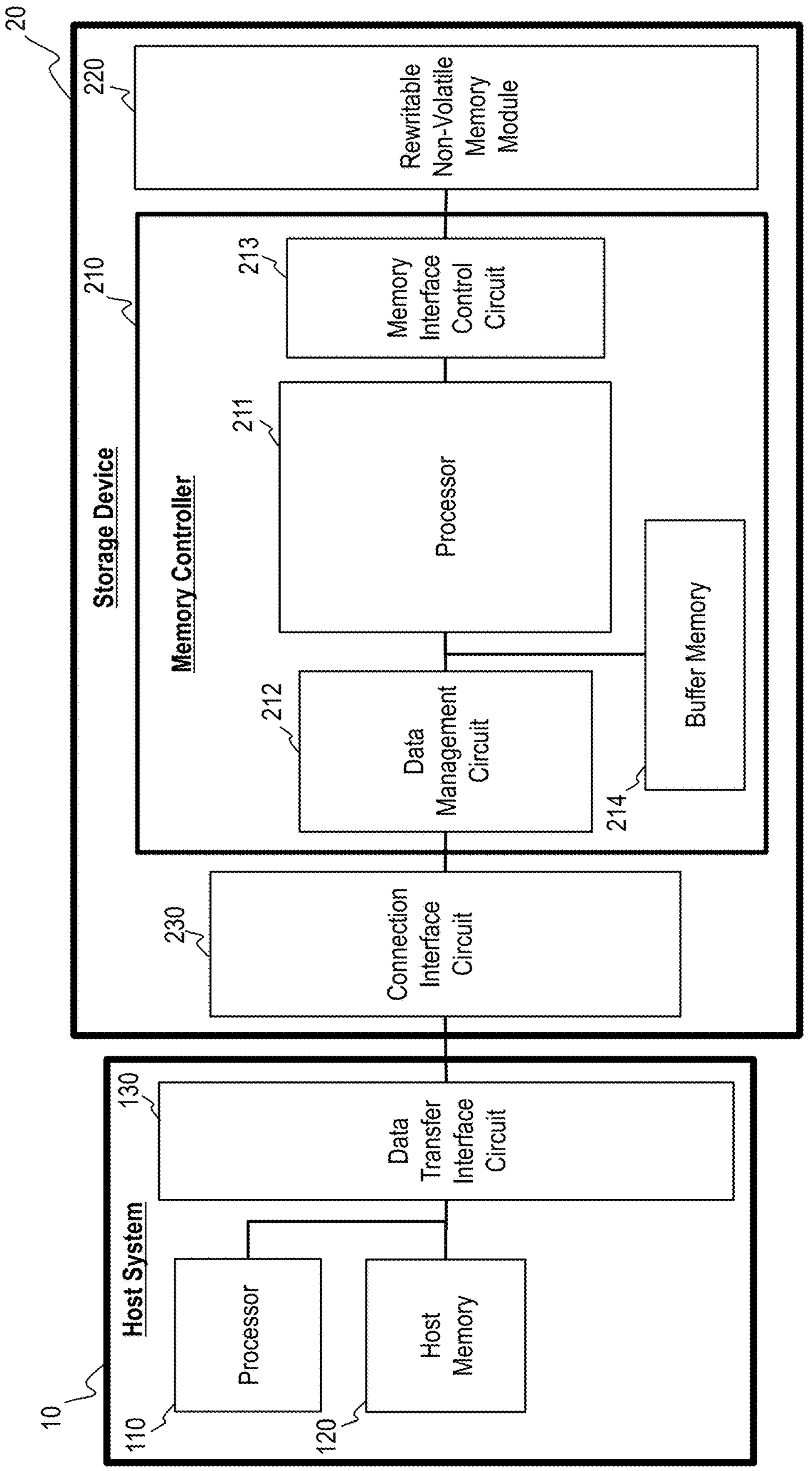
FIG. 1 is a block diagram of a host system and a storage device according to an embodiment of the present invention.

Reference will now be made in detail to exemplary embodiments of the invention, examples of which are illustrated in the accompanying drawings. Wherever possible, the same reference numbers are used in the drawings and the description to refer to the same or like parts.

FIG. 1 is a block diagram of a host system and a storage device according to an embodiment of the present invention. Referring to FIG. 1, the host system 10 may be, for example, a personal computer, a notebook computer, or a server. The host system 10 includes a processor 110, a host memory 120, and a data transfer interface circuit 130. In this embodiment, the processor 110 is coupled (also referred to as electrically connected) to the host memory 120 and the data transfer interface circuit 130. In another embodiment, the processor 110, the host memory 120, and the data transfer interface circuit 130 are coupled to each other through a system bus. In this embodiment, the processor 110, the host memory 120, and the data transfer interface circuit 130 can be disposed on a motherboard of the host system 10.

The storage device 20 includes a storage controller 210, a rewritable non-volatile memory module 220, and a connection interface circuit 230. Wherein, the storage controller 210 includes a processor 211, a data management circuit 212, and a memory interface control circuit 213.

In this embodiment, the host system 10 performs data access operations through the data transfer interface circuit 130 coupled to the connection interface circuit 230 of the storage device 20. For example, the host system 10 can store data to the storage device 20 or read data from the storage device 20 through the data transfer interface circuit 130.

In this embodiment, there can be one or more data transfer interface circuits 130. Through the data transfer interface circuit 130, the motherboard can be coupled to the storage device 20 via wired or wireless means. The storage device 20 can be, for example, a USB flash drive, a memory card, a solid state drive (SSD), or a wireless memory storage device. The wireless memory storage device can be, for example, a near field communication (NFC) memory storage device, a WiFi memory storage device, a Bluetooth memory storage device, or a low power Bluetooth memory storage device (e.g., iBeacon) or other memory storage devices based on various wireless communication technologies. In addition, the motherboard can also be coupled through the system bus to various I/O devices such as a global positioning system (GPS) module, a network interface card, a wireless transmission device, a keyboard, a screen, and speakers.

In this embodiment, the data transfer interface circuit 130 and the connection interface circuit 230 are interface circuits compatible with the Peripheral Component Interconnect Express (PCI Express) standard. Furthermore, data transfer between the data transfer interface circuit 130 and the connection interface circuit 230 is performed using the Non-Volatile Memory express (NVMe) communication protocol.

In another embodiment, the connection interface circuit 230 can be packaged in a chip with the storage controller 210, or the connection interface circuit 230 can be disposed outside a chip containing the storage controller 210.

In this embodiment, the host memory 120 is used to temporarily store instructions or data executed by the processor 110. For example, in this embodiment, the host memory 120 can be Dynamic Random Access Memory (DRAM), Static Random Access Memory (SRAM), or the like. However, it should be understood that the present invention is not limited to this, and the host memory 120 can also be other suitable memories.

The storage controller 210 is used to execute multiple logic gates or control instructions implemented in hardware form or firmware form and perform data write, read, and erase operations in the rewritable non-volatile memory module 220 according to instructions from the host system 10.

More specifically, the processor 211 in the storage controller 210 is hardware with computational capabilities, used to control the overall operation of the storage controller 210. Specifically, the processor 211 is programmed by multiple control instructions/program codes, and when the storage device 20 operates, these control instructions/program codes are executed to perform data write, read, and erase operations. Furthermore, in this embodiment, the control instructions/program codes can also be executed to perform instruction scheduling operations to implement the instruction scheduling method provided by the present invention. The control instructions/program codes corresponding to the instruction scheduling method can also be implemented as hardware circuit units to implement the instruction scheduling method provided by the present invention.

It is worth mentioning that in this embodiment, the processor 110 and processor 211 can be, for example, a Central Processing Unit (CPU), a micro-processor, or other programmable processing units, Digital Signal Processors (DSP), programmable controllers, Application Specific Integrated Circuits (ASIC), Programmable Logic Devices (PLD) or other similar circuit components. The present invention is not limited to these.

In this embodiment, as mentioned above, the storage controller 210 also includes a data management circuit 212 and a memory interface control circuit 213. It should be noted that operations executed by various components of the storage controller 210 can also be considered as operations executed by the storage controller 210.

The data management circuit 212 is coupled to the processor 211, the memory interface control circuit 213, and the connection interface circuit 230. The data management circuit 212 is used to receive instructions from the processor 211 to perform data transfer. For example, obtaining data from the host system 10 (e.g., host memory 120) through the connection interface circuit 230, and writing the obtained data to the rewritable non-volatile memory module 220 through the memory interface control circuit 213 (e.g., performing write operations according to write instructions from the host system 10). The obtained data can also be temporarily stored in the buffer memory 214. Another example is reading data from one or more physical units in the rewritable non-volatile memory module 220 through the memory interface control circuit 213 (data can be read from one or more storage units in one or more physical units), and writing the read data to the host system 10 (e.g., host memory 120) through the connection interface circuit 230 (e.g., performing read operations according to read instructions from the host system 10). In another embodiment, the data management circuit 212 can also be integrated into the processor 211.

The memory interface control circuit 213 is used to receive instructions from the processor 211 and cooperate with the data management circuit 212 to perform write (also called programming) operations, read operations, or erase operations on the rewritable non-volatile memory module 220.

Furthermore, data to be written to the rewritable non-volatile memory module 220 is converted through the memory interface control circuit 213 into a format acceptable to the rewritable non-volatile memory module 220. Specifically, when the processor 211 needs to access the rewritable non-volatile memory module 220, the processor 211 sends corresponding instruction sequences to the memory interface control circuit 213 to instruct the memory interface control circuit 213 to execute corresponding operations. For example, these instruction sequences can include write instruction sequences (also called write instructions) for instructing data writing, read instruction sequences (also called read instructions) for instructing data reading, erase instruction sequences (also called erase instructions) for instructing data erasure, and corresponding instruction sequences for instructing various memory operations. These instruction sequences can include one or more signals, or data on a bus. These signals or data can include instruction codes or program codes. For example, a read instruction sequence will include information such as read identification codes, memory addresses, and physical addresses.

In one embodiment, the storage controller 210 also includes a buffer memory 214. The buffer memory 214 is coupled to the processor 211 and is used to temporarily store data and instructions from the host system 10, data from the rewritable non-volatile memory module 220, or other system data for managing the storage device 20 (such as instruction sequences storing various instructions), so as to allow the processor 211 to quickly access the data, instructions, or system data from the buffer memory 214.

The rewritable non-volatile memory module 220 is coupled to the storage controller 210 (memory interface control circuit 213) and is used to store data written by the host system 10.

Figure 2:
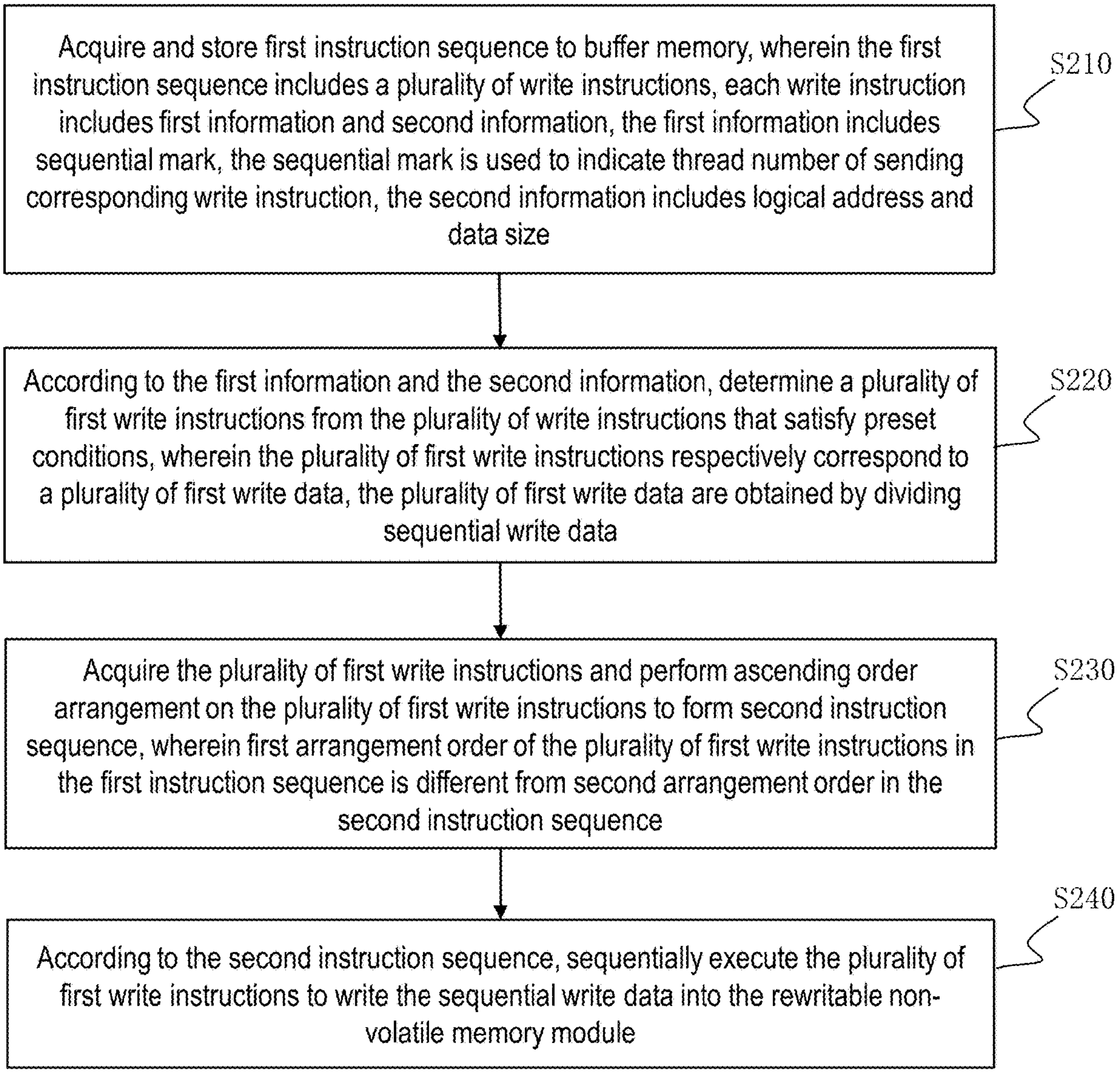
FIG. 2 is a flowchart of a data writing method according to an embodiment of the present invention.

FIG. 2 is a flowchart of a data writing method according to an embodiment of the present invention. Referring to FIG. 2, the steps of the data writing method shown in FIG. 2 specifically include:

Step S210: The processor 211 obtains and stores a first instruction sequence to the buffer memory from the host system, wherein the first instruction sequence comprises a plurality of write instructions, each write instruction comprises first information and second information, the first information comprises a sequential mark, the sequential mark is used to indicate a thread number of sending the corresponding write instruction, the second information comprises a logical address and a data size.

In this embodiment, the processor 110 includes a plurality of processing threads (Threads) that can perform parallel computation, with each processing thread capable of independently processing data computation. In one embodiment, sequential write data of the host system 10 can be written into the storage device 20 by issuing a sequential write instruction to the storage device 20.

Furthermore, to accelerate the computation and resource allocation related to this sequential write data, the processor 110 can parallel process multiple parts of this sequential write data through multiple processing threads. That is, the processor 110 can divide this sequential write data into multiple write data and dispatch them to multiple processing threads, so as to allow the plurality of processing threads to issue write instructions to the storage device 20 after processing their responsible write data, thereby writing the write data processed by each processing thread.

In one embodiment, the processor obtains the plurality of write instructions from the host system, wherein the write instructions are respectively sent by a plurality of processing threads of the host system; forms the first instruction sequence according to the receiving times of the plurality of write instructions; stores the first instruction sequence to the buffer memory.

Figure 3:
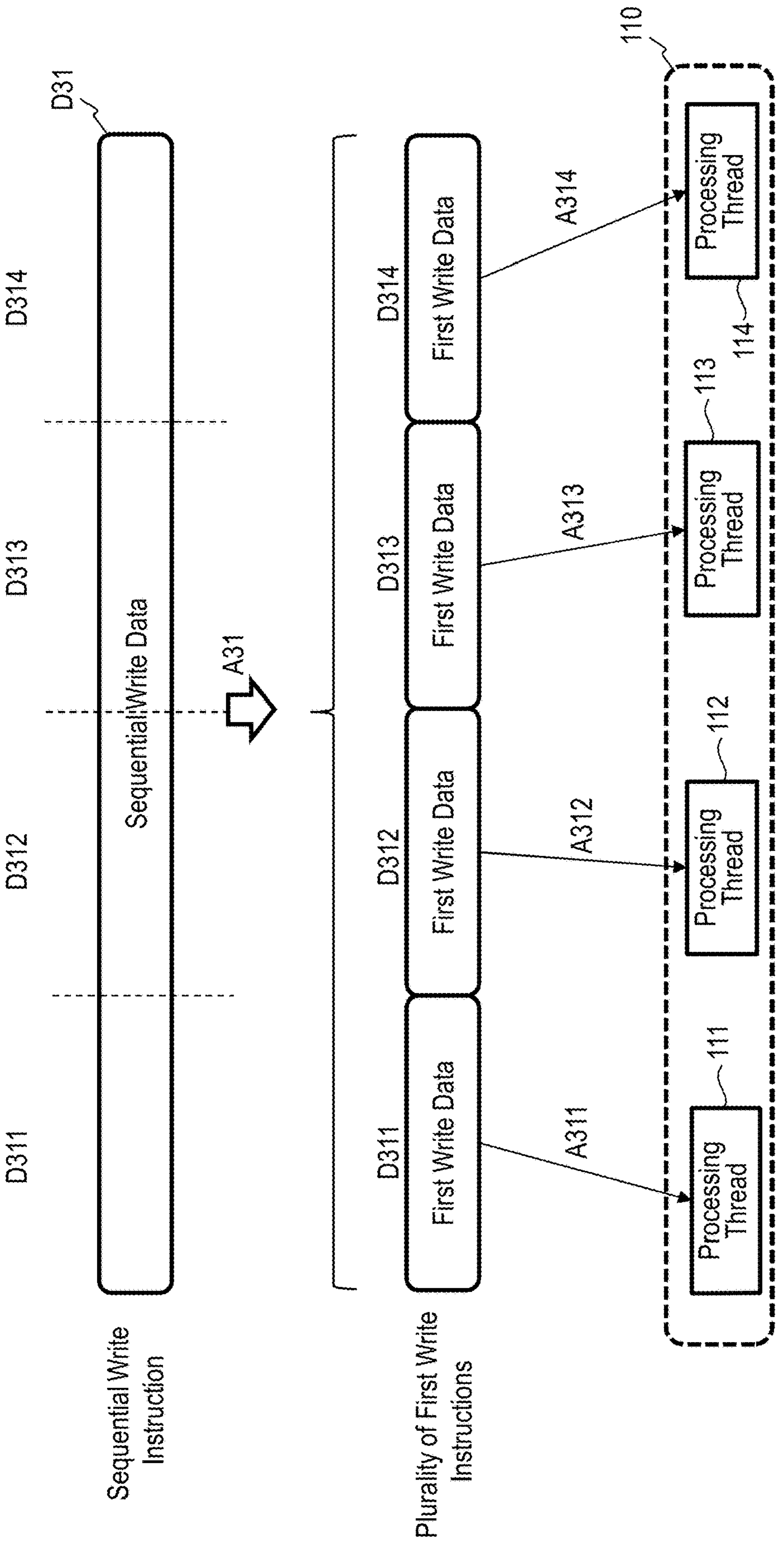
FIG. 3 is a schematic diagram showing sequential write data of a sequential write instruction being dispatched to a plurality of processing threads.

FIG. 3 is a schematic diagram showing sequential write data being dispatched to multiple processing threads. For example, referring to FIG. 3, in one embodiment, assuming the host system 10 wants the storage device 20 to write sequential write data D31 (the operating system of the host system 10 has already written this sequential write data to continuous logical addresses), and the processor 110 has 4 processing threads 111-114. According to the number of processing threads 111-114, the sequential write data D31 is divided into 4 first write data D311, D312, D313, D314.

Then, as shown by arrow A31, the 4 first write data D311, D312, D313, D314 and related metadata (such as logical addresses and data sizes) are dispatched by the processor 110 to the 4 processing threads 111-114 of the processor 110. That is, processing thread 111 is responsible for generating first write instruction C311 for writing first write data D311; processing thread 112 is responsible for generating first write instruction C312 for writing first write data D312; processing thread 113 is responsible for generating first write instruction C313 for writing first write data D313; processing thread 114 is responsible for generating first write instruction C314 for writing first write data D314.

The host system 10 expects to write data that is sequential, but due to multiple processing threads and the independence of each processing thread, the processor 110 cannot control whether the instructions issued to the storage device 20 are issued in the expected order, resulting in the write instructions from the host system 10 received by the storage device 20 not being in the optimal sequential order (equivalent to the position order of first write data D311, D312, D313, D314 within sequential write data D31).

Figure 4:
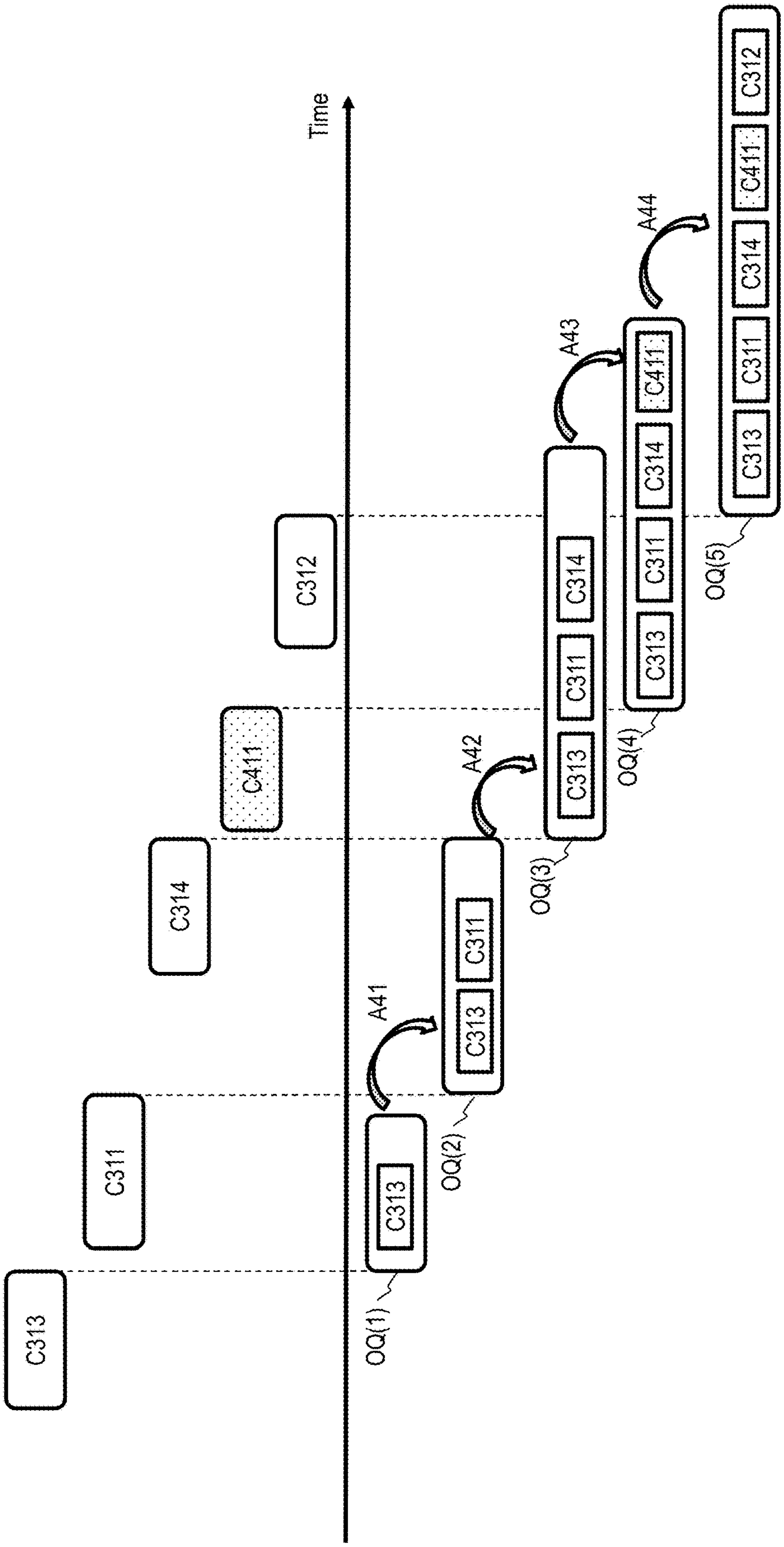
FIG. 4 is a schematic diagram showing updating of the first instruction sequence according to the plurality of write instructions obtained from the plurality of processing threads of the host system according to an embodiment of the present invention.

FIG. 4 is a schematic diagram showing updating of the first instruction sequence according to write instructions obtained from multiple processing threads of the host system. For example, referring to FIG. 4, assuming processing thread 113 first sends first write instruction C313 to the storage device 20, and after the processor 211 obtains first write instruction C313, it temporarily stores first write instruction C313 in first instruction sequence OQ(1). Then, as shown by arrow A41, processing thread 111 sends first write instruction C311 to the storage device 20, and after the processor 211 obtains first write instruction C311, the first instruction sequence OQ(1) is updated to become first instruction sequence OQ(2) by storing first write instruction C311. According to the time of obtaining first write instruction C311 and first write instruction C313, the processor 211 will arrange first write instruction C311 after first write instruction C313.

Then, as shown by arrow A42, processing thread 114 sends first write instruction C314 to the storage device 20, and after the processor 211 obtains first write instruction C314, the first instruction sequence OQ(2) is updated to become first instruction sequence OQ(3) by storing first write instruction C314. According to the time of obtaining first write instruction C314 and first write instruction C311, the processor 211 will arrange first write instruction C314 after first write instruction C311.

Then, as shown by arrow A43, processing thread 111 sends write instruction C411 (a write instruction not corresponding to sequential write data D31) to the storage device 20, and after the processor 211 obtains write instruction C411, the first instruction sequence OQ(3) is updated to become first instruction sequence OQ(4) by storing first write instruction C411. According to the time of obtaining write instruction C411 and first write instruction C314, the processor 211 will arrange write instruction C411 after first write instruction C314.

Then, as shown by arrow A44, processing thread 112 sends first write instruction C312 to the storage device 20, and after the processor 211 obtains first write instruction C312, the first instruction sequence OQ(4) is updated to become first instruction sequence OQ(5) by storing first write instruction C312. According to the time of obtaining first write instruction C312 and write instruction C411, the processor 211 will arrange first write instruction C312 after write instruction C411. It should be noted that the above first instruction sequences OQ(1)-OQ(5) will be stored and updated in the buffer memory 214.

Returning to FIG. 2, then, in step S220, according to the first information and the second information, determining a plurality of first write instructions from the plurality of write instructions that satisfy preset conditions, wherein the plurality of first write instructions respectively correspond to first write data, the first write data are obtained by dividing sequential write data.

In one embodiment, determining the plurality of first write instructions that satisfy the preset conditions according to the first information and the second information comprises: identifying the thread number of each write instruction according to the first information; identifying the logical address and data size of each write instruction according to the second information; determining the plurality of first write instructions that satisfy the preset conditions according to the thread number, logical address and data size, wherein the preset conditions comprise: logical addresses between the plurality of first write instructions are continuous, thread numbers of the plurality of first write instructions based on logical address sorting are continuous and arranged in ascending order, and a sum of data sizes of first write data corresponding to the plurality of first write instructions is equal to a predetermined storage data size.

For example, in the example of FIG. 4, the processor 211 can identify the number of each write instruction according to the first information, wherein the first information includes a sequential mark used to indicate the thread number of sending the corresponding write instruction. As shown in FIG. 4, according to the first information, it identifies that the write instructions C313, C311, C314, C411, C312 in the first instruction sequence OQ(5) that correspond to the same sequential write instruction (or sequential write data) are C313, C311, C314, C312.

Furthermore, according to the second information, the processor 211 can identify the starting logical address and data size of the first write data D311 corresponding to first write instruction C311, and calculate the ending logical address of first write data D311.

Then, the processor 211 can identify the starting logical address and data size of the first write data D312 corresponding to first write instruction C312, determine that first write data D312 will connect after first write data D311 based on the starting logical address of first write data D312, and calculate the ending logical address of first write data D312. And so on, the processor 211 can identify that first write data D311-D314 are sequentially connected continuous data, belonging to the same sequential write data D31. Meanwhile, the thread numbers of first write instructions C311-C314 corresponding to first write data D311-D314 are also arranged in sequence (ascending order). For example, as shown in FIG. 3, the arrangement of thread numbers will correspond to processing threads 111-114 that process first write data D311-D314.

In addition, the processor 211 can also identify the second arrangement order of first write data D311-D314 within sequential write data D31. This second arrangement order will equal the arrangement order of thread numbers of write instructions C311-C314 corresponding to first write data D311-D314. In another embodiment, the processor 211 will further determine whether the total data size of first write data D311-D314 equals the predetermined storage data size (e.g., 4096 bytes).

Figure 5:
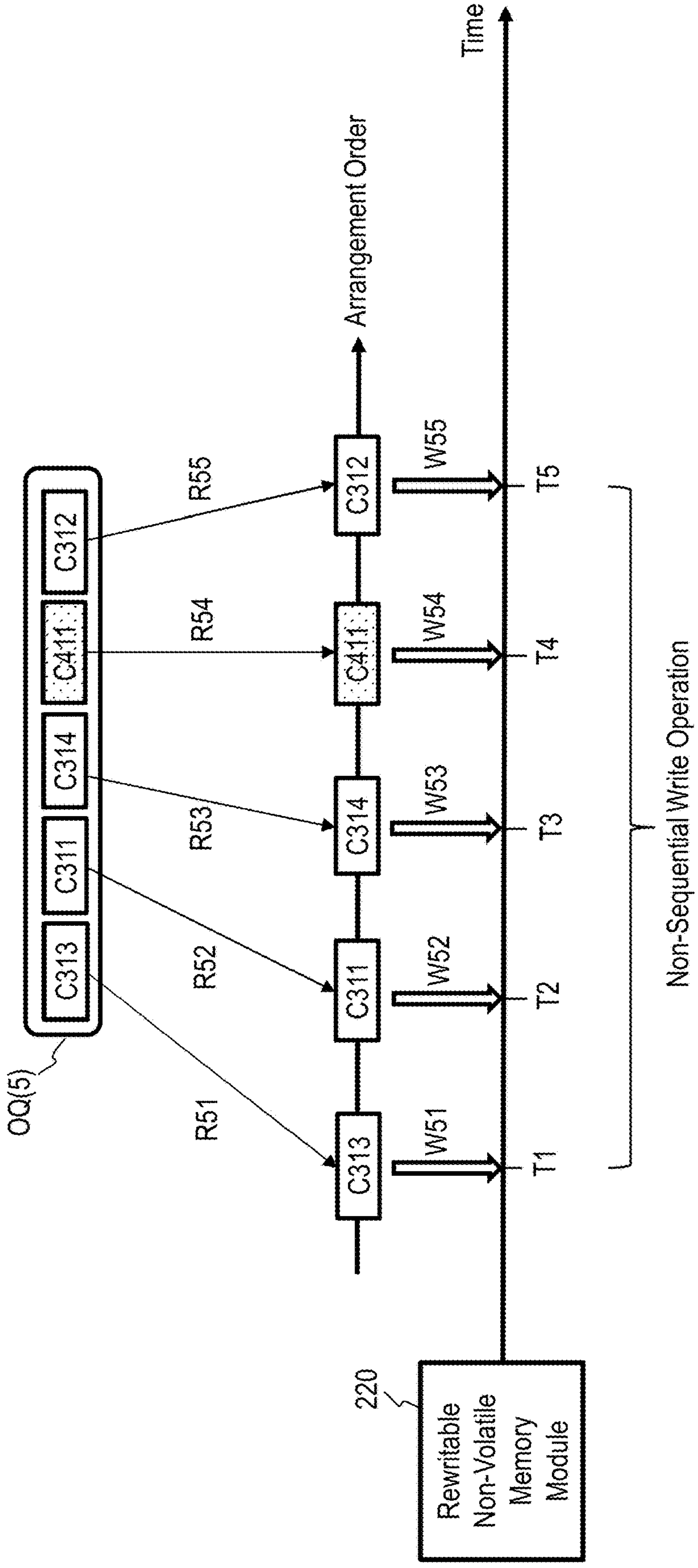
FIG. 5 is a schematic diagram showing executing data write operations according to the first instruction sequence according to an embodiment of the present invention.

FIG. 5 is a schematic diagram showing executing data write operations according to the first instruction sequence according to an embodiment of the present invention. For example, referring to FIG. 5, assuming the current first instruction sequence OQ(5) has 5 sequentially arranged first write instructions C313, C311, C314, C411, C312. In traditional data writing methods, as shown by instruction fetch R51, the processor 211 would directly obtain write instructions sequentially from the first instruction sequence OQ(5), without first determining whether there exist multiple write instructions corresponding to the same sequential write data and obtaining these write instructions corresponding to the same sequential write data first. For example, in the traditional approach, first write instruction C313 would be obtained first according to its arrangement order in the first instruction sequence. Similarly, as shown by instruction fetches R52-R55, subsequent first write instructions C311, C314, C411, C312 would be obtained sequentially.

Furthermore, in traditional writing methods, the processor 211 would execute corresponding write operations sequentially according to the order of obtaining first write instructions. For example, as shown by write operation W51, first write instruction C313, which was obtained first, would be executed first to write corresponding first write data D313 to the rewritable non-volatile memory module 220 at time T1; then, as shown by write operation W52, obtained first write instruction C311 would be executed to write corresponding first write data D311 to the rewritable non-volatile memory module 220 at time T2. And so on, as shown by write operation W55, obtained first write instruction C312 would be executed last to write corresponding first write data D312 to the rewritable non-volatile memory module 220 at time T5.

Returning to FIG. 2, then, in step S230, obtaining the plurality of first write instructions and performing ascending order arrangement on the plurality of first write instructions to form a second instruction sequence, wherein a first arrangement order of the plurality of first write instructions in the first instruction sequence is different from a second arrangement order in the second instruction sequence.

It can be noticed that through traditional data writing methods, first write data D311-D314 corresponding to sequential write data D31 are not written sequentially, which differs from the sequential write operation expected by the host system 10. That is, through traditional data writing methods, although multiple processing threads can be used to accelerate data write processing, sequential write operations cannot be guaranteed.

Therefore, in one or more embodiments of the present invention, write instructions corresponding to the same sequential write data will first be identified and obtained, and through reordering operations performed on write instructions corresponding to sequential write data to obtain reordered write instructions, sequential writing of multiple write data belonging to sequential write data can be ensured by executing the reordered write instructions. As such, sequential write data can be properly written to the rewritable non-volatile memory module 220 through sequential write operations as expected by the host system 10.

In this embodiment, the processor 211 obtains write instructions from the instruction sequence based on the principle of processing write instructions that were stored in the instruction sequence earlier first.

Then, returning to FIG. 2, in step S240, according to the second instruction sequence, sequentially executing each first write instruction, so as to write the sequential write data into the rewritable non-volatile memory module 220.

Figure 6:
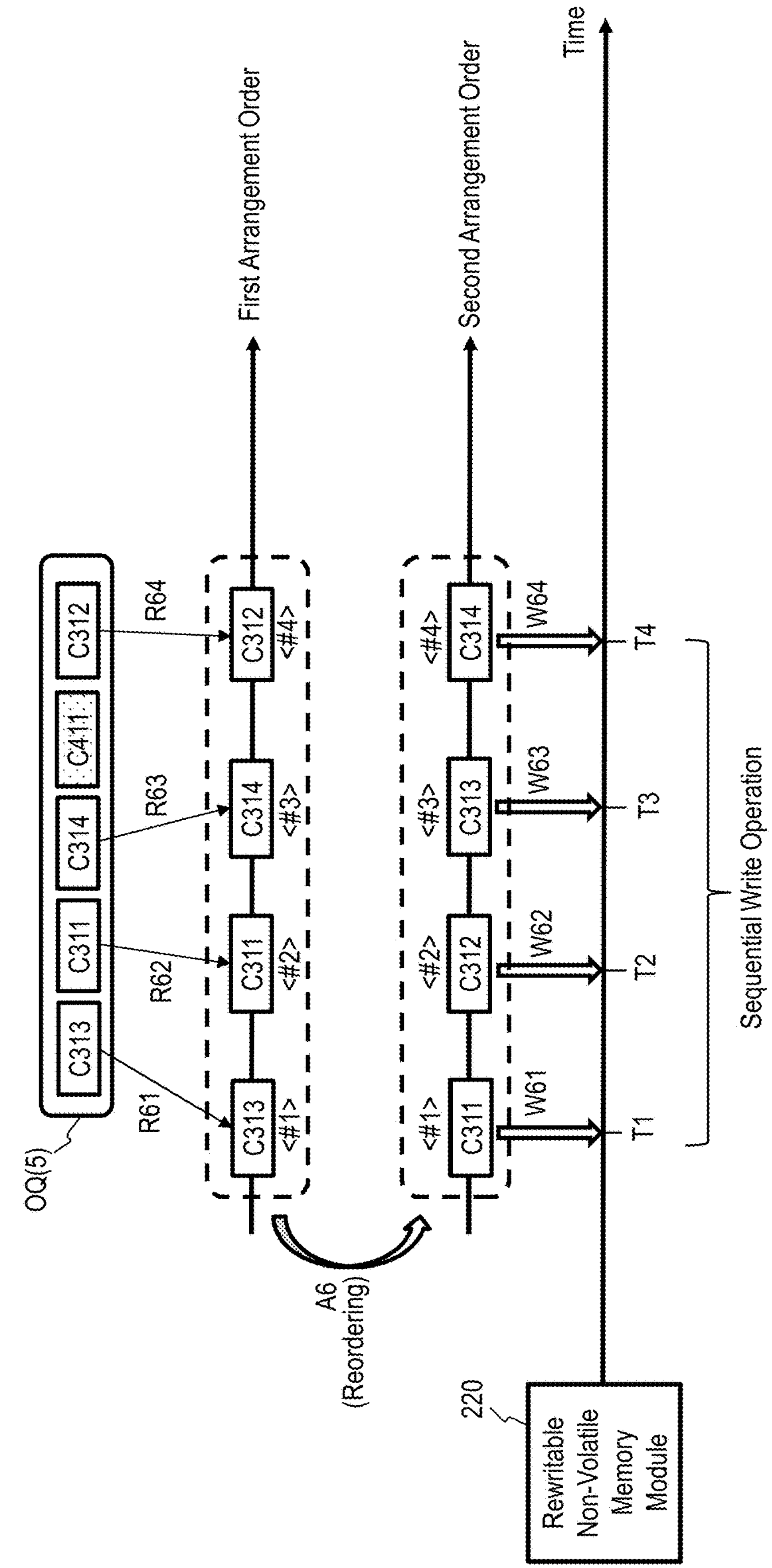
FIG. 6 is a schematic diagram showing executing sequential write operations according to reordered plurality of write instructions corresponding to sequential write instruction according to an embodiment of the present invention.

FIG. 6 is a schematic diagram showing executing sequential write operations according to reordered plurality of write instructions corresponding to sequential write instruction according to an embodiment of the present invention. For example, referring to FIG. 6, assuming the first instruction sequence OQ(5) stores five write instructions C313, C311, C314, C411, C312, and among them, first write instructions C313, C311, C314, C312 each have write data coming from the same sequential write data D31 (as in the example related to FIG. 3 above). In this example, as shown by instruction fetches R61-R64, after identifying first write instructions C313, C311, C314, C312 corresponding to the same sequential write data, the processor 211 will obtain these first write instructions C313, C311, C314, C312 sequentially according to their arrangement order #1, #2, #3, #4 (also called first arrangement order) in the first instruction sequence OQ(5). For example, the obtaining order of first write instructions C313, C311, C314, C312 is #1, #2, #3, #4 respectively.

Then, as shown by arrow A6, the processor 211 will determine the order of first write data D313, D311, D314, D312 corresponding to first write instructions C313, C311, C314, C312 in sequential write data D31 according to the second information (also can be called second arrangement order) to be #3, #1, #4, #2, and reorder first write instructions C313, C311, C314, C312 according to this order. That is, based on the second arrangement order, first write instructions C313, C311, C314, C312 will be reordered as first write instructions C311, C312, C313, C314.

After obtaining the reordered first write instructions C311, C312, C313, C314, as shown by write operations W61-W64, the processor 211 executes first write instructions C311, C312, C313, C314 sequentially to write corresponding first write data D311, D312, D313, D314 to the rewritable non-volatile memory module 220 through sequential write operations.

In one embodiment, performing ascending order arrangement on the plurality of first write instructions to form the second instruction sequence comprises: obtaining a first instruction and a second instruction from the plurality of first write instructions, wherein the first instruction corresponds to a first logical address and the second instruction corresponds to a second logical address; according to the first logical address and the second logical address, performing ascending order arrangement on the first instruction and the second instruction to obtain a second sub-instruction sequence; obtaining remaining write instructions sequentially and updating the second sub-instruction sequence according to corresponding logical addresses thereof, until all first write instructions are obtained to obtain the second instruction sequence, wherein the remaining write instructions are the first write instructions that have not been performed with ascending order arrangement in the plurality of first write instructions, the remaining write instructions comprise one or more instructions.

Specifically, randomly obtaining two write instructions (such as the first instruction and the second instruction) from the current plurality of first write instructions; furthermore, performing ascending order arrangement according to the first logical address and second logical address corresponding to the first instruction and second instruction respectively, to obtain a first sub-instruction sequence.

For example: if the first logical address of the first instruction is less than the second logical address of the second instruction, then the first sub-instruction sequence sorting result is: first instruction, second instruction; otherwise, the first sub-instruction sequence sorting result is: second instruction, first instruction.

Furthermore, continuing to obtain remaining write instructions, and updating the second sub-instruction sequence according to logical addresses corresponding to the remaining write instructions (that is, inserting the remaining write instructions into the second sub-instruction sequence to obtain the second instruction sequence). Wherein, the second arrangement order of the second instruction sequence is arranged in ascending order according to the logical address corresponding to each first write instruction.

Thus, through the implementation provided by this application example, based on performing ascending order sorting according to the logical address of each first write instruction, the plurality of first write instructions are sorted to obtain the second instruction sequence. This achieves arranging the first write instructions to be processed in a logically continuous manner, then executing the second instruction sequence sequentially, ultimately ensuring continuous storage of data to be written, improving storage space utilization and write performance of the memory controller.

In one possible example, the remaining write instructions include a third instruction, the third instruction corresponds to a third logical address, when the second logical address is greater than the first logical address, obtaining remaining write instructions sequentially and updating the second sub-instruction sequence according to corresponding logical addresses thereof comprises: if the third logical address is greater than the second logical address, inserting the third instruction at a tail of the second sub-instruction sequence to obtain a third sub-instruction sequence; or, if the third logical address is less than the first logical address, inserting the third instruction at a head of the second sub-instruction sequence to obtain the third sub-instruction sequence; or, if the third logical address is greater than the first logical address and less than the second logical address, inserting the third instruction between the first instruction and the second instruction to obtain the third sub-instruction sequence.

For example, continuing to obtain a third instruction from the remaining plurality of first write instructions. According to the comparison results of the third logical address corresponding to the third instruction with the first logical address and the second logical address respectively, inserting the third instruction into the first sub-instruction sequence to obtain the second sub-instruction sequence.

Specifically, taking the second sub-instruction sequence as first instruction, second instruction as an example. If the third logical address corresponding to the third instruction is less than the first logical address, then insert the third instruction at the head position of the second sub-instruction sequence to obtain the updated second sub-instruction sequence as: third instruction, first instruction, second instruction; if the third logical address is greater than the first logical address and less than the second logical address, then the updated second sub-instruction sequence is: first instruction, third instruction, second instruction; if the third logical address is greater than the second logical address, then the updated second sub-instruction sequence is: first instruction, second instruction, third instruction. Repeat the above process until each first write instruction in the plurality of first write instructions is inserted into the second sub-instruction sequence to obtain the final second instruction sequence.

Figure 7:
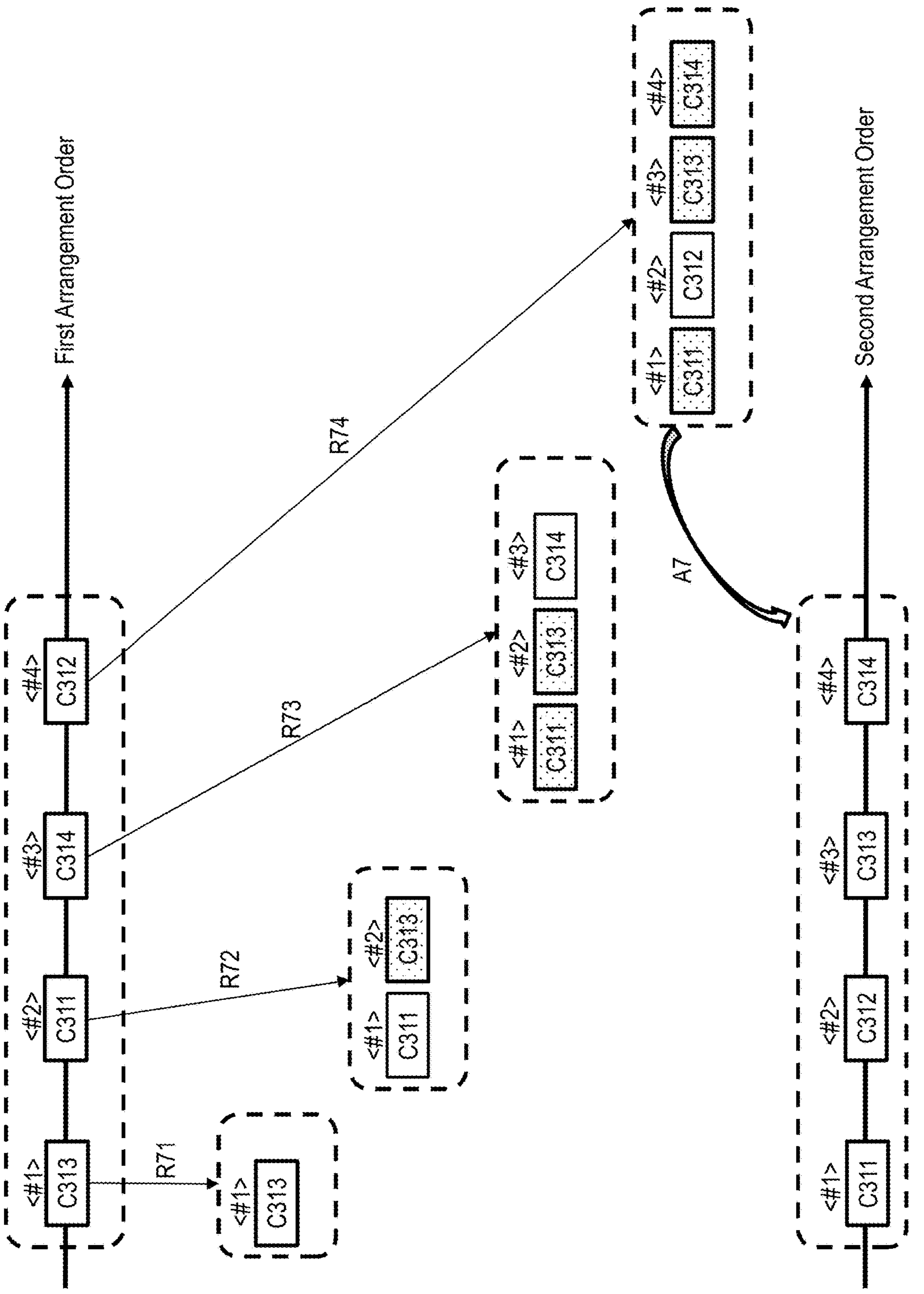
FIG. 7 is a schematic diagram showing reordering operations according to an embodiment of the present invention.

Specifically, FIG. 7 is a schematic diagram showing reordering operations according to an embodiment of the present invention. For example, referring to FIG. 7, assuming 4 first write instructions C313, C311, C314, C312 corresponding to the same sequential write data D31 have been identified, arranged according to the first arrangement order.

As shown by instruction fetch R71, the processor 211 first obtains the first first write instruction C313, and sets the order of first write instruction C313 to #1. Then, as shown by instruction fetch R72, the processor 211 obtains the second first write instruction C311, and according to their respective logical addresses, determines that first write instruction C311 should be arranged before first write instruction C313, and sets the order of first write instruction C311 to #1 and first write instruction C313 to #2. Then, as shown by instruction fetch R73, the processor 211 obtains the third first write instruction C314, and according to their respective logical addresses, determines that first write instruction C314 should be arranged after first write instruction C313, and sets the order of first write instruction C314 to #3. Then, as shown by instruction fetch R74, the processor 211 obtains the fourth first write instruction C312, and according to the respective logical addresses of first write instructions C312, C313, and C311, determines that first write instruction C312 should be arranged after first write instruction C311 and before first write instruction C313, and sets the order of first write instruction C312 to #2, first write instruction C313 to #3, and first write instruction C314 to #4. As shown by arrow A7, when there are no first write instructions that have not been reordered among all obtained first write instructions, the processor 211 determines that the reordering operation of first write instructions C313, C311, C314, C312 has been completed, and obtains second write instructions C311, C312, C313, C314 arranged according to the second arrangement order.

In one embodiment, the processor 211 further stores the plurality of second write instructions to a second instruction sequence in the buffer memory, and executes the second instruction sequence, so as to write sequential write data corresponding to sequential write instruction into the rewritable non-volatile memory module 220.

It should be noted that the plurality of second write instructions herein are used to represent the plurality of first write instructions after ascending order arrangement, that is, essentially, the second write instructions are the determined first write instructions.

In another embodiment, the processor 211 further combines first write data of each of the plurality of second write instructions into sequential write data, and generates corresponding sequential write instruction, so as to write the combined sequential write data to the rewritable non-volatile memory module 220 through sequential write operation by executing the generated sequential write instruction.

Figure 8:
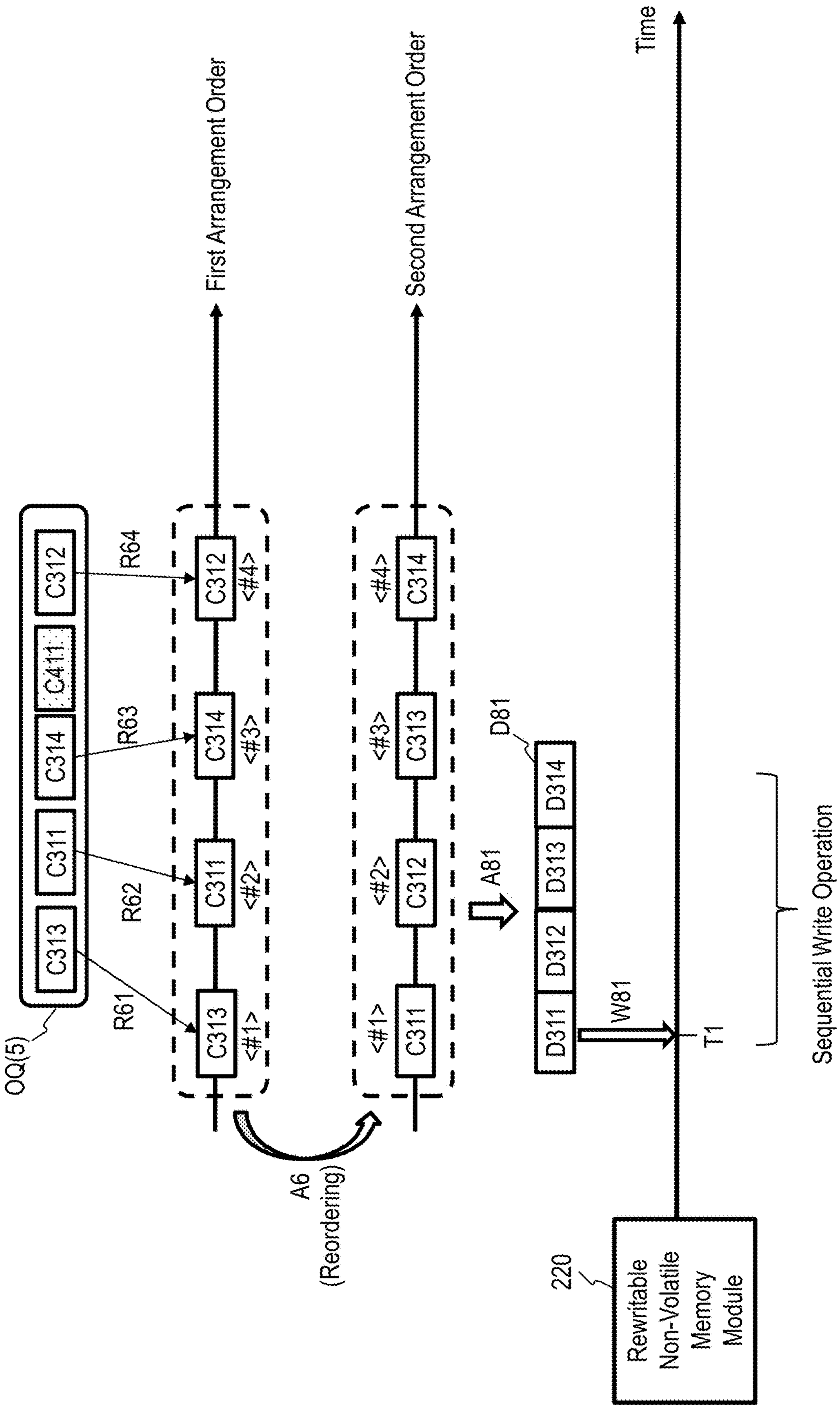
FIG. 8 is a schematic diagram showing executing sequential write operations by treating write data corresponding to reordered plurality of write instructions as sequential write data according to another embodiment of the present invention.

FIG. 8 is a schematic diagram showing executing sequential write operations by treating write data corresponding to reordered plurality of write instructions as sequential write data according to another embodiment of the present invention. For example, referring to FIG. 8, continuing with the example in FIG. 6, after obtaining the reordered first write instructions C311-C314 (also called second write instructions C311-C314), as shown by arrow A81, the processor 211 combines first write data D311-D314 corresponding to first write instructions C311-C314 into a complete sequential write data D81. Then, as shown by write operation W81, the processor 211 executes sequential write operation to write sequential write data D81 into the rewritable non-volatile memory module 220.

Through sequential write operation, the processor 211 can more efficiently manage/allocate multiple continuous physical addresses provided for first write data D311-D314 and corresponding logical addresses. For example, only one set of logical-to-physical address mapping fields can be used to record mapping information.

Furthermore, because the physical addresses are continuous, the processor 211 can more efficiently execute read operations for first write data D311-D314. For example, sequential read speed and efficiency will be higher than random reads.

In one embodiment, the processor 211 removes the obtained plurality of first write instructions from the first instruction sequence, and executes the second instruction sequence, so as to write sequential write data corresponding to the sequential write instruction into the rewritable non-volatile memory module 220.

Figure 9:
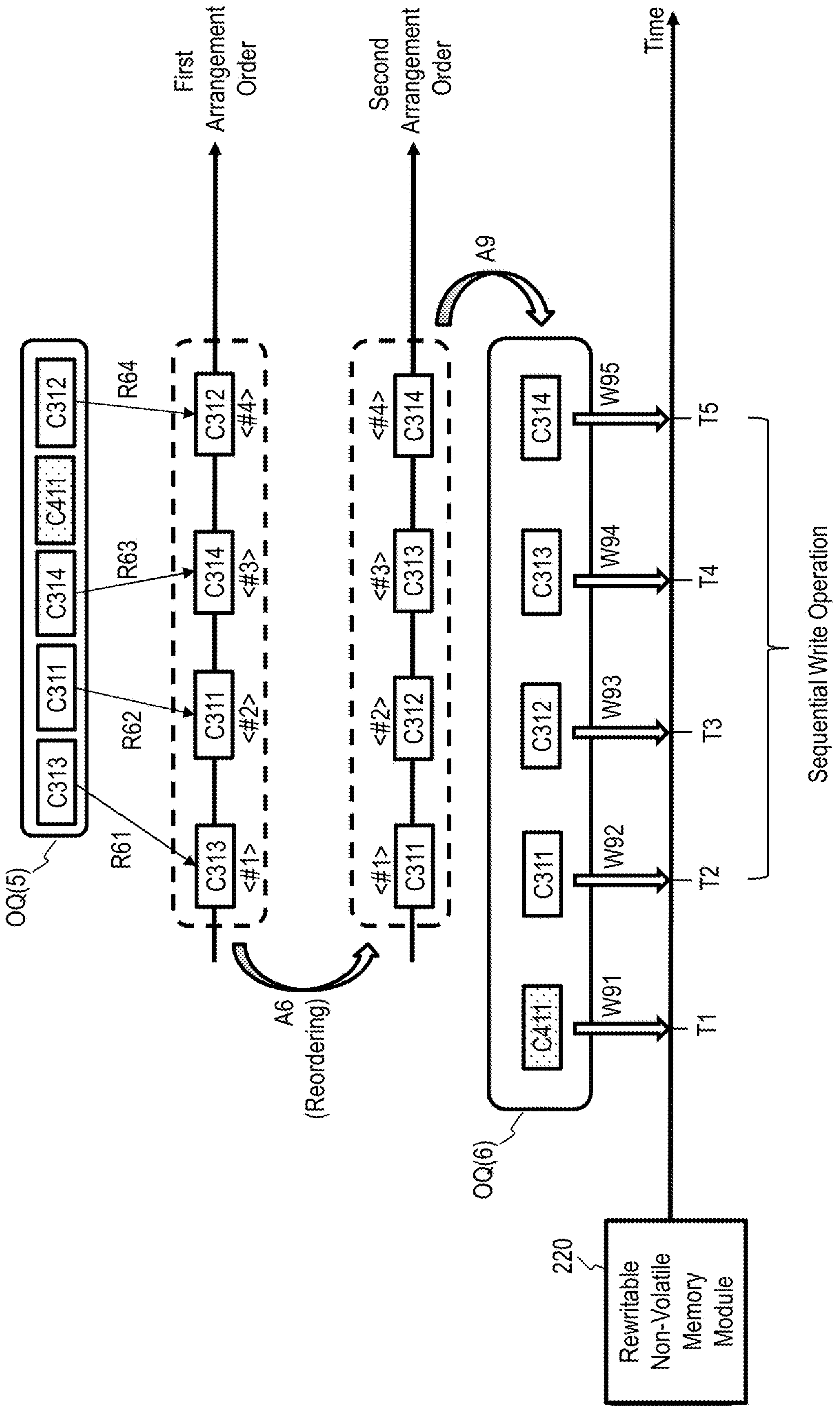
FIG. 9 is a schematic diagram showing executing sequential write operations according to the first instruction sequence having reordered plurality of write instructions according to an embodiment of the present invention.

FIG. 9 is a schematic diagram showing executing sequential write operations according to the first instruction sequence having reordered plurality of write instructions according to an embodiment of the present invention. For example, referring to FIG. 9, continuing with the example in FIG. 6, after obtaining the reordered first write instructions C311-C314 (also called second write instructions C311-C314), as shown by arrow A9, the processor 211 stores second write instructions C311-C314 to first instruction sequence OQ(5) to obtain first instruction sequence OQ(6) (e.g., second write instructions C311-C314 are stored after remaining write instruction C411 in the first instruction sequence). In this embodiment, first write instructions C313, C311, C314, C312 originally in first instruction sequence OQ(5) have already been removed when instruction fetch was executed previously.

Then, as shown by write operations W91-W9, the processor 211 executes write instructions C411, C311, C312, C313, C314 in first instruction sequence OQ(6) sequentially to write corresponding write data into the rewritable non-volatile memory module 220.

It should be noted that in another embodiment, second write instructions C311-C314 are inserted before remaining write instruction C411 due to the need for priority processing.

Through the above-described embodiments, organizing the first instruction sequence OQ(6) is equivalent to preventing write data that should be written sequentially from being written to the rewritable non-volatile memory module in a discrete/non-sequential/random manner, thereby reducing the discreteness of data written by executing the organized first instruction sequence and effectively enhancing the data management efficiency of the storage device 20. Furthermore, it can also streamline the storage space consumed by the first instruction sequence, improving the space utilization of the buffer memory.

In one embodiment, when obtaining each first write instruction, the processor 211 determines whether the obtained first write instruction allows overwrite operation. If the obtained first write instruction allows overwrite operation, it is determined that the obtained first write instruction does not need to execute reordering operation; if the obtained first write instruction does not allow overwrite operation, it is determined that the obtained first write instruction needs to execute reordering operation. For example, the write instruction can include an overwrite flag. When the overwrite flag is set to a first value (e.g., 1), it indicates that overwrite between different threads exists (overwrite operation is allowed). That is, before performing the reordering operation, first check whether overwrite operation is allowed. If yes, then to avoid the risk of data confusion, the processor 211 does not execute reordering operation.

In the example of FIG. 9, it is equivalent to organizing the first instruction sequence OQ(6), which can prevent write data that should be sequentially written from being written to the rewritable non-volatile memory module in a discrete/non-sequential/random manner, thereby reducing the discreteness of data written by executing the organized first instruction sequence and effectively enhancing the data management efficiency of storage device 20.

In one embodiment, wherein when obtaining each first write instruction, the processor 211 determines whether the obtained first write instruction allows overwrite operation. If the obtained first write instruction allows overwrite operation, it is determined that the obtained first write instruction does not need to execute reordering operation; and if the obtained first write instruction does not allow overwrite operation, it is determined that the obtained first write instruction needs to execute reordering operation. For example, the write instruction can include an overwrite flag. When the overwrite flag is set to a first value (e.g., 1), it indicates that there exists overwrite between different threads (allowing overwrite operation). That is, before performing the reordering operation, first check whether overwrite operation is allowed. If yes, then to avoid the risk of data confusion, the processor 211 does not execute reordering operation.

In one embodiment, before executing the plurality of first write instructions according to the second arrangement order to write sequential write data into the rewritable non-volatile memory module 220, the processor 211 sets a queue status register according to the second arrangement order, so as to notify the host system 10 to perform sequential write operation according to the second arrangement order.

The queue status register (QSR) carries task status at a specific point in time in the instruction sequence. The host system 10 can read this register through the response to the SEND_QUEUE_STATUS command of EMMC (Embedded MultiMediaCard) (CMD13, bit[15]="1"), and the parameter of RI will be the value of the 32-bit queue status register (QSR). Each bit in QSR represents the ID of the task corresponding to the bit index. If bit QSR[i]="0", then the queued task with task ID i is not ready for execution. The host system 10 is responsible for tracking the status of tasks to determine whether a task is queued and pending, or whether the task ID is unused. If bit QSR[i]="1", then it is determined that the queued task with task ID i is ready for execution.

In short, through the data writing method provided by this embodiment, the storage device 20 actually still performs data writing according to write instructions issued by the host system 10, so after the processor 211 helps with reordering, it still needs to perform the operation of setting the queue status register to inform the host system 10 of the sequential write operation to be performed. Then, the storage device 20 can truly implement sequential write according to the reordered data writing order.

It should be noted that in the above embodiments, the processor 110 has 4 processing threads, but the present invention is not limited to this. For example, in other embodiments, the processor 110 can have more (e.g., 8) or fewer processing threads, and the number of divided write data and write instructions will also correspond to the number of processing threads.

Based on the above, the storage device, memory controller and data writing method used thereby provided by the embodiments of the present invention can actively reorder the obtained plurality of write instructions when the plurality of threads of the host system non-sequentially send the plurality of write instructions corresponding to sequential write instruction respectively, so as to perform sequential write operation according to the arrangement order of the reordered plurality of write instructions. As such, the problem that traditional storage devices and memory controllers using data writing methods cannot execute sequential write operations expected by the host system can be solved, the write data corresponding to sequential write instructions can be effectively written sequentially into the rewritable non-volatile memory module, so as to actually execute sequential write operations required by the host system, thereby reducing random write operations caused by multi-threading and improving overall data access capability of the storage device.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A data writing method, applied to control a storage device configured with a rewritable non-volatile memory module, the storage device comprising a memory interface control circuit, a buffer memory and a processor, the processor being coupled to the memory interface control circuit, the buffer memory and a connection interface circuit of the storage device, the method comprising:

obtaining and storing a first instruction sequence to the buffer memory, wherein the first instruction sequence comprises a plurality of write instructions, each write instruction comprises first information and second information, the first information indicates a thread number corresponding to the write instruction, the second information comprises a logical address and data size;

according to the first information and the second information, determining a plurality of first write instructions from the plurality of write instructions that satisfy preset conditions, wherein the preset conditions comprise:

logical addresses between the plurality of first write instructions are continuous, and thread numbers of the plurality of first write instructions based on logical address sorting are continuous and arranged in ascending order, wherein the plurality of first write instructions respectively correspond to a plurality of first write data, and the plurality of first write data are obtained by dividing sequential write data;

obtaining the plurality of first write instructions and performing ascending order arrangement on the plurality of first write instructions to form the second instruction sequence, wherein the first arrangement order of the plurality of first write instructions in the first instruction sequence is different from the second arrangement order in the second instruction sequence; and according to the second instruction sequence, sequentially executing the plurality of first write instructions to write the sequential write data into the rewritable non-volatile memory module.

2. The data writing method according to claim 1, wherein performing ascending order arrangement on the plurality of first write instructions to form the second instruction sequence comprises:

obtaining a first instruction and a second instruction from the plurality of first write instructions, wherein the first instruction corresponds to a first logical address, and the second instruction corresponds to a second logical address;

according to the first logical address and the second logical address, performing ascending order arrangement on the first instruction and the second instruction to obtain a second sub-instruction sequence; and obtaining remaining write instructions sequentially and updating the second sub-instruction sequence according to corresponding logical addresses thereof until all first write instructions are obtained to obtain the second instruction sequence, wherein the remaining write instructions are first write instructions that have not been performed with ascending order arrangement.

3. The data writing method according to claim 2, the remaining write instructions comprise a third instruction corresponding to a third logical address, wherein when the second logical address is greater than the first logical address, obtaining remaining write instructions sequentially and updating the second sub-instruction sequence according to corresponding logical addresses comprises:

if the third logical address is greater than the second logical address, inserting the third instruction at the end of the queue of the second sub-instruction sequence to obtain a third sub-instruction sequence;

if the third logical address is less than the first logical address, inserting the third instruction at the head of the queue of the second sub-instruction sequence to obtain the third sub-instruction sequence; and if the third logical address is greater than the first logical address and less than the second logical address, inserting the third instruction between the first instruction and the second instruction to obtain the third sub-instruction sequence.

4. The data writing method according to claim 1, wherein obtaining and storing the first instruction sequence into the buffer memory comprises:

obtaining the plurality of write instructions from the host system, wherein the plurality of write instructions are respectively sent by a plurality of processing threads;

forming the first instruction sequence according to receiving times of the plurality of write instructions; and storing the first instruction sequence into the buffer memory.

5. The data writing method according to claim 1, wherein the method further comprises: removing the obtained plurality of first write instructions from the first instruction sequence, and executing the second instruction sequence to write the sequential write data corresponding to the sequential write instructions into the rewritable non-volatile memory module.

6. The data writing method according to claim 1, wherein determining the plurality of first write instructions that satisfy the preset conditions according to the first information and the second information comprises:

identifying the thread number of each write instruction according to the first information;

identifying the logical address and the data size of each write instruction according to the second information; and determining the plurality of first write instructions that satisfy the preset conditions according to the thread number, the logical address and the data size, wherein the preset conditions further comprise: the sum of data sizes of first write data corresponding to the plurality of first write instructions is equal to a predetermined storage data size.

7. The data writing method according to claim 1, wherein the plurality of first write instructions in the second instruction sequence satisfy:

corresponding thread numbers are continuous and arranged in ascending order;

corresponding sum of the data sizes is equal to a predetermined storage data size; and corresponding first logical addresses are continuous.

8. The data writing method according to claim 1, wherein the method further comprises: before executing the plurality of first write instructions in sequence according to the second instruction sequence to write the sequential write data into the rewritable non-volatile memory module, setting a queue status register according to the second arrangement order, to indicate the host system to perform sequential write operation according to the second arrangement order.

9. The data writing method according to claim 1, wherein the method further comprises: before obtaining the plurality of first write instructions, determining whether the plurality of first write instructions allow overwrite operation, wherein if overwriting operation is allowed, the plurality of first write instructions are not obtained; and if overwriting operation is not allowed, obtaining the plurality of first write instructions are obtained and performing ascending order arrangement to obtain the second instruction sequence.

10. A memory controller for controlling a storage device configured with a rewritable non-volatile memory module, wherein the memory controller comprises:

a memory interface control circuit for coupling to the rewritable non-volatile memory module;

a buffer memory;

a processor, coupled to the memory interface control circuit, the buffer memory and a connection interface circuit of the storage device, wherein the processor is configured to:

obtain and store a first instruction sequence to the buffer memory, wherein the first instruction sequence comprises a plurality of write instructions, each write instruction comprises first information and second information, the first information indicates a thread number corresponding to the write instruction, the second information comprises a logical address and data size;

according to the first information and the second information, determine a plurality of first write instructions from the plurality of write instructions that satisfy preset conditions, wherein the preset conditions comprise:

logical addresses between the plurality of first write instructions are continuous, and thread numbers of the plurality of first write instructions based on logical address sorting are continuous and arranged in ascending order, wherein the plurality of first write instructions respectively correspond to a plurality of first write data, and the plurality of first write data are obtained by dividing sequential write data;

obtain the plurality of first write instructions and perform ascending order arrangement on the plurality of first write instructions to form the second instruction sequence, wherein the first arrangement order of the plurality of first write instructions in the first instruction sequence is different from the second arrangement order in the second instruction sequence; and according to the second instruction sequence, sequentially execute the plurality of first write instructions to write the sequential write data into the rewritable non-volatile memory module.

11. The memory controller according to claim 10, wherein performing ascending order arrangement on the plurality of first write instructions to form the second instruction sequence comprises:

obtaining a first instruction and a second instruction from the plurality of first write instructions, wherein the first instruction corresponds to a first logical address, and the second instruction corresponds to a second logical address;

performing ascending order arrangement on the first instruction and the second instruction according to the first logical address and the second logical address to obtain a second sub-instruction sequence; and obtaining remaining write instructions sequentially and updating the second sub-instruction sequence according to corresponding logical addresses thereof until all first write instructions are obtained to obtain the second instruction sequence, wherein the remaining write instructions are first write instructions that have not been performed with ascending order arrangement.

12. The memory controller according to claim 11, the remaining write instructions comprise a third instruction corresponding to a third logical address, wherein when the second logical address is greater than the first logical address, obtaining remaining write instructions sequentially and updating the second sub-instruction sequence according to corresponding logical addresses comprises:

if the third logical address is greater than the second logical address, inserting the third instruction at the end of the queue of the second sub-instruction sequence;

if the third logical address is less than the first logical address, inserting the third instruction at the head of the queue of the second sub-instruction sequence; and if the third logical address is greater than the first logical address and less than the second logical address, inserting the third instruction between the first instruction and the second instruction.

13. The memory controller according to claim 10, wherein obtaining and storing the first instruction sequence into the buffer memory comprises:

obtaining the plurality of write instructions from the host system, wherein the plurality of write instructions are respectively sent by a plurality of processing threads;

forming the first instruction sequence according to receiving times of the plurality of write instructions; and storing the first instruction sequence into the buffer memory.

14. The memory controller according to claim 10, wherein the processor removes the obtained plurality of first write instructions from the first instruction sequence, and executes the second instruction sequence to write the sequential write data corresponding to the sequential write instructions into the rewritable non-volatile memory module.

15. The memory controller according to claim 10, wherein determining the plurality of first write instructions that satisfy the preset conditions according to the first information and the second information comprises:

identifying the thread number of each write instruction according to the first information;

identifying the logical address and the data size of each write instruction according to the second information; and determining the plurality of first write instructions that satisfy the preset conditions according to the thread number, the logical address and the data size, wherein the preset conditions further comprise: the sum of data sizes of first write data corresponding to the plurality of first write instructions is equal to a predetermined storage data size.

16. The memory controller according to claim 10, wherein the plurality of first write instructions in the second instruction sequence satisfy:

corresponding thread numbers are continuous and arranged in ascending order;

corresponding sum of the data sizes is equal to a predetermined storage data size; and corresponding first logical addresses are continuous.

17. The memory controller according to claim 10, wherein before executing the plurality of first write instructions in sequence according to the second instruction sequence to write the sequential write data into the rewritable non-volatile memory module, the processor sets a queue status register according to the second arrangement order, to indicate the host system to perform sequential write operation according to the second arrangement order.

18. The memory controller according to claim 10, wherein the method further comprises: before obtaining the plurality of first write instructions, the processor determines whether the plurality of first write instructions allow overwrite operation, wherein if overwrite operation is allowed, the processor does not obtain the plurality of first write instructions; and if overwrite operation is not allowed, the processor obtains the plurality of first write instructions and performs ascending order arrangement to obtain the second instruction sequence.

* * * * *